(12) United States Patent
Winkler

(10) Patent No.: US 7,392,612 B2
(45) Date of Patent: Jul. 1, 2008

(54) SYSTEM AND APPARATUS FOR CHAIR FISHING

(76) Inventor: Richard E. Winkler, P.O. Box 150594, Forth Worth, TX (US) 76108

( * ) Notice: Subject to any disclaimer, the term of this patent is extended or adjusted under 35 U.S.C. 154(b) by 309 days.

(21) Appl. No.: 10/978,657

(22) Filed: Nov. 1, 2004

(65) Prior Publication Data

US 2005/0126064 A1    Jun. 16, 2005

Related U.S. Application Data

(60) Provisional application No. 60/528,534, filed on Dec. 10, 2003.

(51) Int. Cl.
*A01K 97/10* (2006.01)
*A47C 7/62* (2006.01)

(52) U.S. Cl. .................. 43/21.2; 297/188.21
(58) Field of Classification Search .............. 43/21.2; 297/188.21
See application file for complete search history.

(56) References Cited

U.S. PATENT DOCUMENTS

| | | | |
|---|---|---|---|
| 401,302 A | 4/1889 | Purdy | |
| D78,016 S | 3/1929 | Goble | |
| 1,956,956 A | 5/1934 | Leibo | |
| 3,299,969 A | 1/1967 | Inderbitzen | |
| 3,747,881 A * | 7/1973 | Akamu | 248/514 |
| 3,851,916 A * | 12/1974 | Quartullo | 297/188.21 |
| 4,085,686 A | 4/1978 | Turner et al. | |
| 4,879,963 A * | 11/1989 | Dionne | 114/363 |
| 5,110,184 A | 5/1992 | Stein et al. | |
| 5,364,163 A | 11/1994 | Hardison | |
| 5,673,966 A | 10/1997 | Morton, Jr. | |
| 5,795,017 A * | 8/1998 | Zimmerman et al. | 297/15 |
| 5,857,748 A | 1/1999 | Knight | |
| D460,281 S | 7/2002 | Shields et al. | |
| 6,435,614 B1 * | 8/2002 | Gollahon | 297/344.1 |
| 6,494,643 B1 * | 12/2002 | Thurner | 405/244 |

* cited by examiner

*Primary Examiner*—Kurt Rowan
(74) *Attorney, Agent, or Firm*—Bracewell & Giuliani LLP

(57) ABSTRACT

A fishing chair mounts directly in the sandy bottom of a relatively shallow surf. A vacuum pump pulls a base pole down into the sand to form a sturdy foundation, even in rough surf conditions. A seat assembly is mounted at the upper end of the base pole. The chair mount may be fabricated from composite materials or plastic, such as PVC, to prevent corrosion. The chair mount is also provided with a foot rest or step that is braced against the base pole. The surf fishing chair is positioned above the waves under normal surf conditions, but also withstands larger wave impacts while safely supporting a fisherman in the seat structure. Other features include adjustable fishing pole holders, a tackle box, a bait box, a bait cutting surface, a fish net holder, and a fish stringer and basket.

16 Claims, 16 Drawing Sheets

SYSTEM AND APPARATUS FOR CHAIR FISHING

The present patent application is based on U.S. Provisional Patent Application No. 60/528,534, filed on Dec. 10, 2003, and is incorporated herein by reference.

BACKGROUND OF THE INVENTION

1. Technical Field

The present invention relates in general to an improved fishing chair and, in particular, to an improved system, method, and apparatus for fishing from a chair.

2. Description of the Related Art

Fishing chairs designed for seating a fisherman are well known in the art. The following U.S. patents are representative of some of these chairs: U.S. Pat. Nos. 3,623,766; 3,825,962; 4,103,965; 4,278,289; 4,772,068; and 4,722,567. U.S. Pat. Nos. 3,623,766, 3,825,962, 4,103,965, 4,278,289, and 4,722,567 have a common characteristic in that the respective front legs and the rear legs of the respective chairs are the same length. Many people who fish stay at one location for a considerable period of time, and they prefer to sit down while fishing. When placing a conventional fishing chair having front and rear legs of equal height, the person sitting often feels off balance or feels a considerable strain while sitting on the chair. In this respect, it would be desirable if a chair for fishermen were provided that permitted a fisherman to sit comfortably on the chair regardless of the conditions.

One of the patents cited above (U.S. Pat. No. 4,772,068), discloses a fishing chair that has adjustable rear legs that permit the seat of the chair to be adjusted to a level orientation by shorten some legs to accommodate a sloped surface. Although this patent addresses the problem of a sloped bank of a body of water, this patent does not address another important problem of a fisherman sitting on a bank. The other problem is the softness of sand or soil that is present. Often the sand or soil is not packed tightly. For this reason, the legs of the chair may readily wander as the person sits on the chair. In this respect, it would be desirable if a chair for fisherman were provided that included means for preventing the legs of the chair from wandering on sand or soil that is not tightly packed.

The ground on which fishermen fish also varies in their degrees of slope. In this respect, it would be desirable if a chair for fisherman were provided which were adjustable for a variety of sloped banks. Moreover, a fishing chair may be carried considerable distances from an automobile or truck to a bank. In this respect, it would be desirable if a chair for fisherman were provided that is lightweight and easily carried. A fishing chair is subjected to exposure to relatively large quantities of water and other elements. In this respect, it would be desirable if a chair for fisherman were provided that were resistant to rust and easily cleaned. Thus, while the prior art teaches the use of fishing chairs, it still lacks many desirable qualities. Other advantages of the present invention over the prior art also will be evident.

SUMMARY OF THE INVENTION

One embodiment of a system and apparatus for chair fishing comprises a lightweight chair design that, for example, mounts directly in the sandy bottom of a relatively shallow surf. The chair uses a vacuum pump to pull a base pole down into the sand approximate two to three feet to form a sturdy foundation, even in relatively rough surf conditions. The vacuum pump may be a manual pump or an automated pump, such as an electrical pump. The present invention also has a seat assembly that is mounted at or near the upper end of the base pole either before or after installation of the base pole in the sand. The chair mount may be fabricated from composite materials or plastic, such as PVC, to prevent corrosion. The chair mount is also provided with a foot rest or step that is braced against the base pole.

The fishing chair is positioned above the waves under normal surf conditions. However, the system is designed to withstand wave impacts that strike the structure below the seat assembly while safely supporting a fisherman in the seat structure. Other features of the fishing chair include adjustable fishing pole holders, a tackle box, a bait box, a bait cutting surface, a fish net holder, and a fish stringer and fish basket support.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
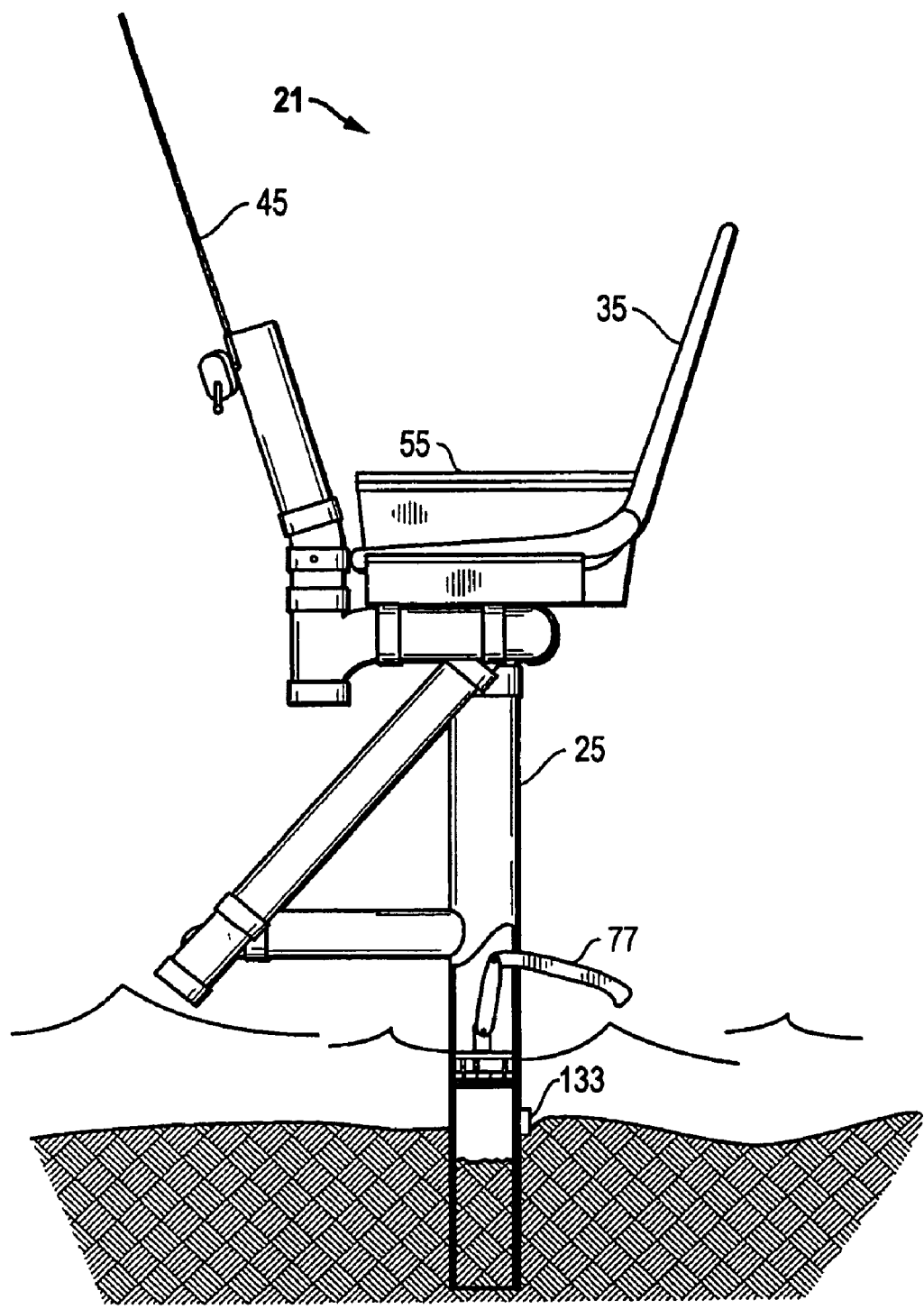
FIG. 1 is a sectional side view of one embodiment of a fishing chair constructed in accordance with the present invention and is shown in normal surf conditions.
Figure 2:
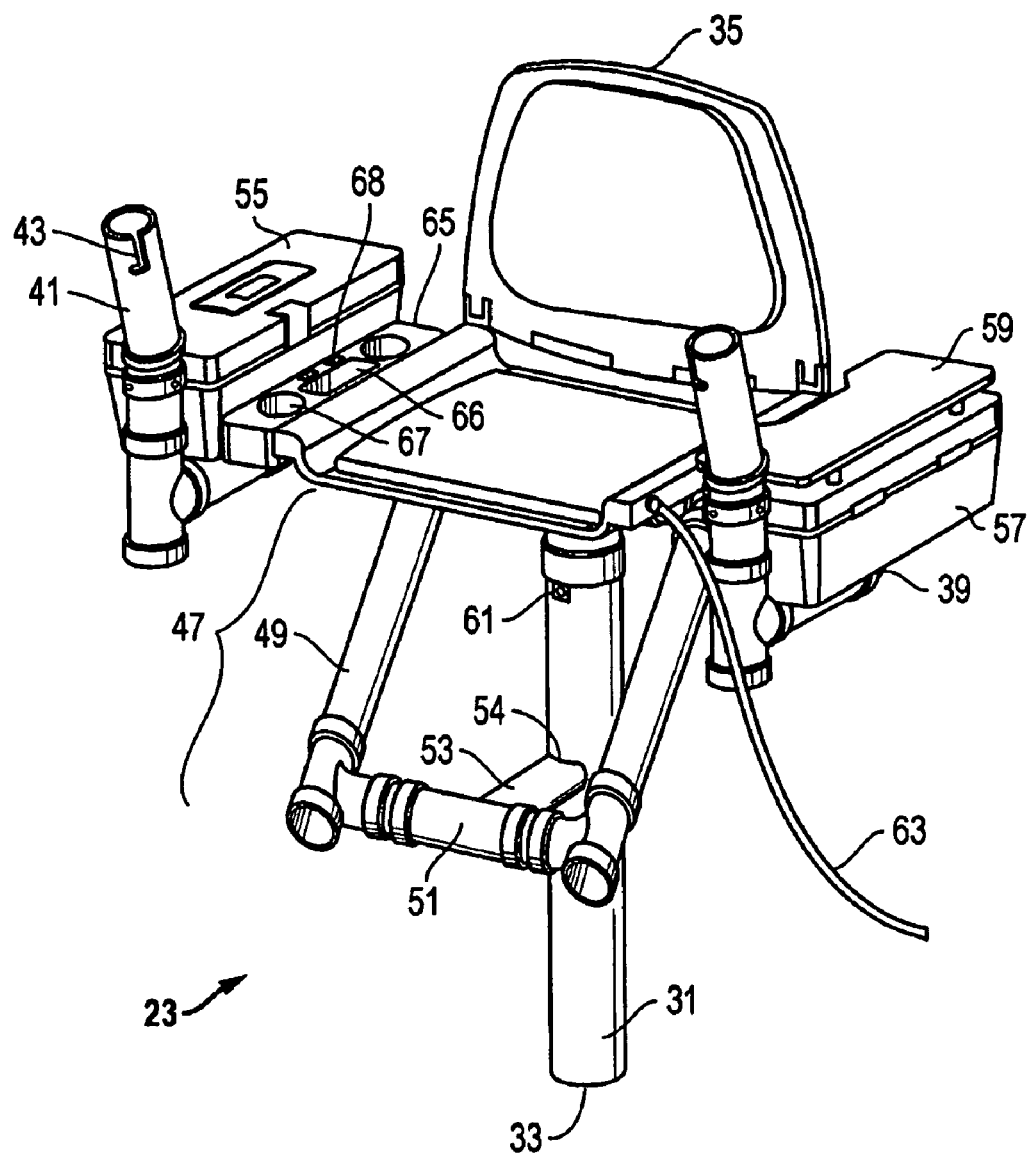
FIG. 2 is an isometric view of the fishing chair of FIG. 1.
Figure 3:
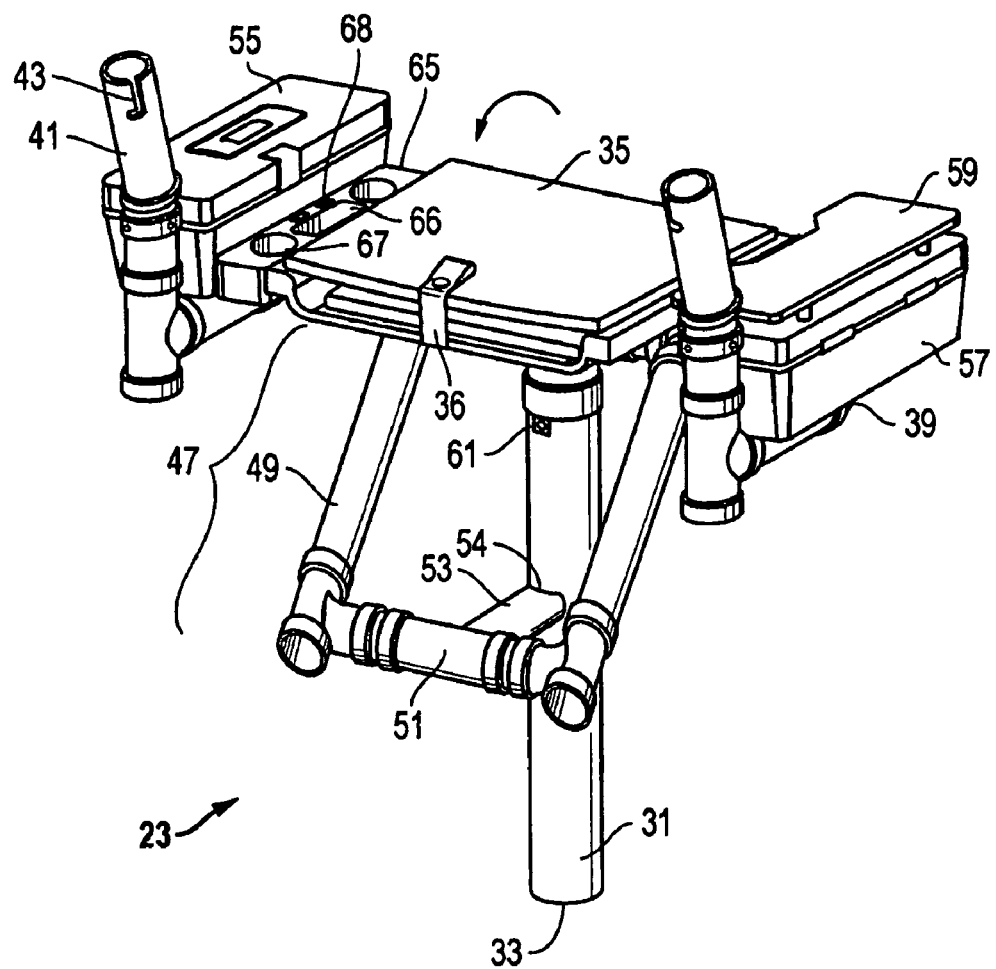
FIG. 3 is an isometric view of the fishing chair of FIG. 1 with the seat in a folded position.
Figure 4:
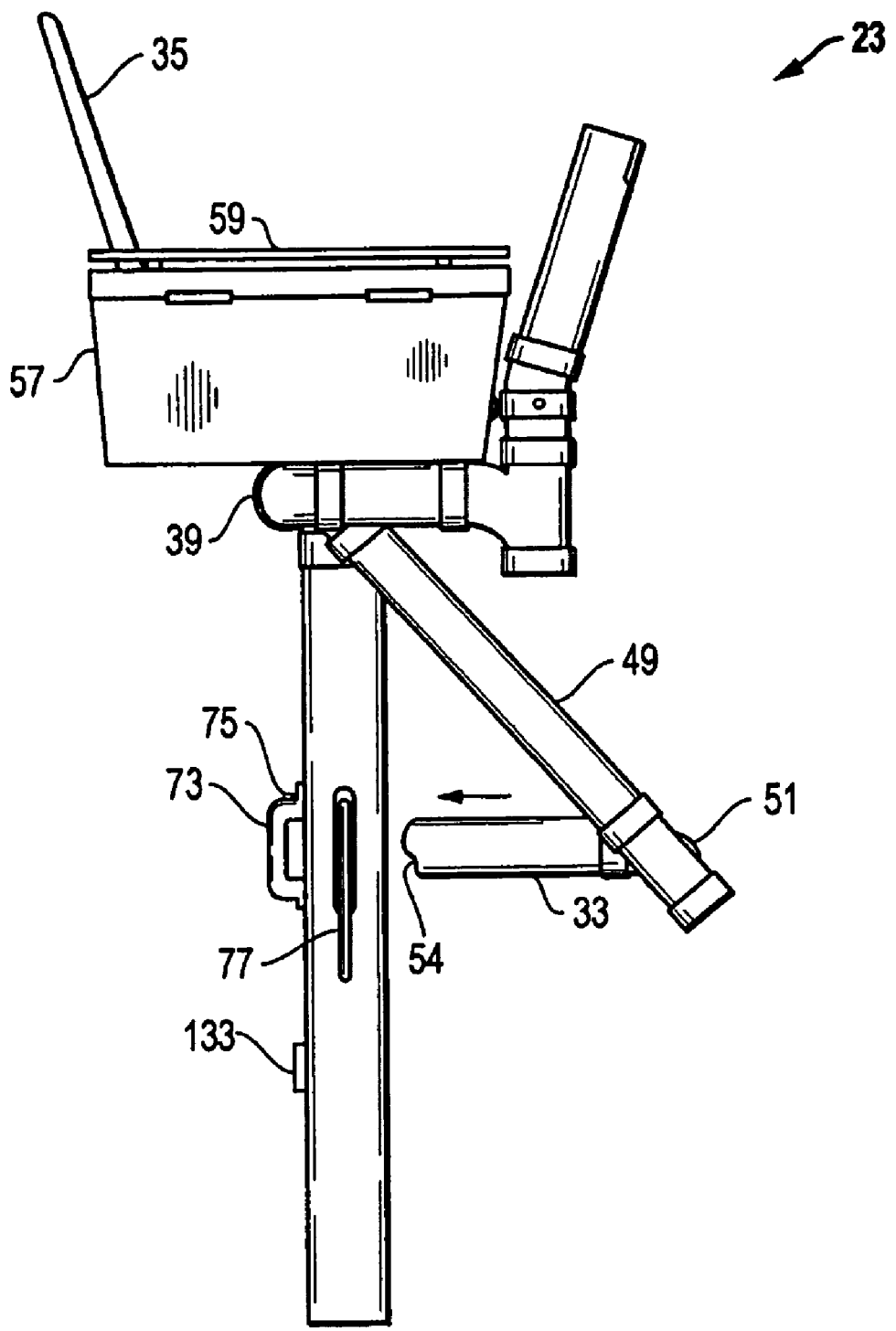
FIG. 4 is a side view of the fishing chair of FIG. 1.

Referring to FIGS. 1-3, one embodiment of a system and apparatus for chair fishing is shown. The device 21 comprises two main components and a series of optional and auxiliary components. The two main components are a seat assembly 23 and a vertically-oriented base pole 25. As will be described in greater detail below, the lower portion of the base pole 25 is designed to be removably embedded in sand or other penetrable soils. An optional depth limit block 133 is mounted to an exterior surface of the base pole 25 for limiting the depth to which base pole 25 may be buried in the sand. The seat assembly 23 is designed to be mounted to the upper portion of the base pole 25. The seat assembly 23 may be installed on the base pole 25 either before or after the base pole 25 is secured in the sand.

The entire device 21 is lightweight and may be installed by one person even in moderate surf conditions. The various components of the device 21 are preferably fabricated from composite materials or plastic, such as PVC, to prevent corrosion. After installation, the seat assembly 23 is positioned above the waves of the surf under normal surf conditions. The device 21 also is designed to withstand wave impacts that strike portions of the device 21 below the fisherman while safely supporting the fisherman with the seat assembly 23.

Figure 5:
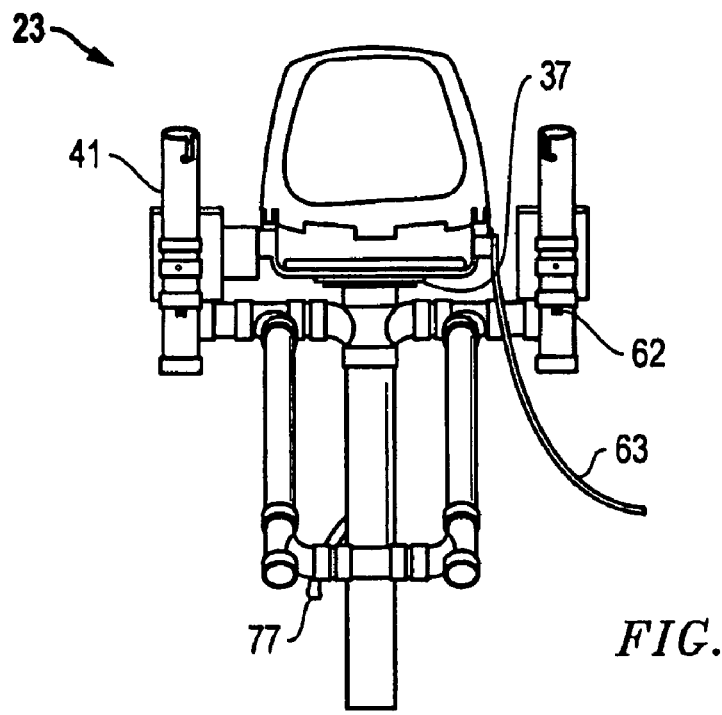
FIG. 5 is a front view of the fishing chair of FIG. 1 with the fishing pole holders in a forward-extending position.

As shown in FIGS. 2 and 3, the seat assembly 23 comprises a vertical support tube 31 having a lower end 33 that attaches directly to the upper portion of the base pole 25. A seat 35 is secured to, the upper end of the vertical support tube 31 for supporting a fisherman when positioned in the seat 35. The seat 35 may be provided with a swivel 37 (FIG. 5) so that it can rotate with respect to the rest of the seat assembly 23. The seat 35 also can be collapsible or foldable (FIG. 3) and may include a retention device 36 for retaining the seat 35 in the folded configuration. A horizontal tube 39 extends laterally from the vertical support tube 31. The horizontal tube 39 has at least one adjustable fishing pole holder 41 (two shown).

Figure 6:
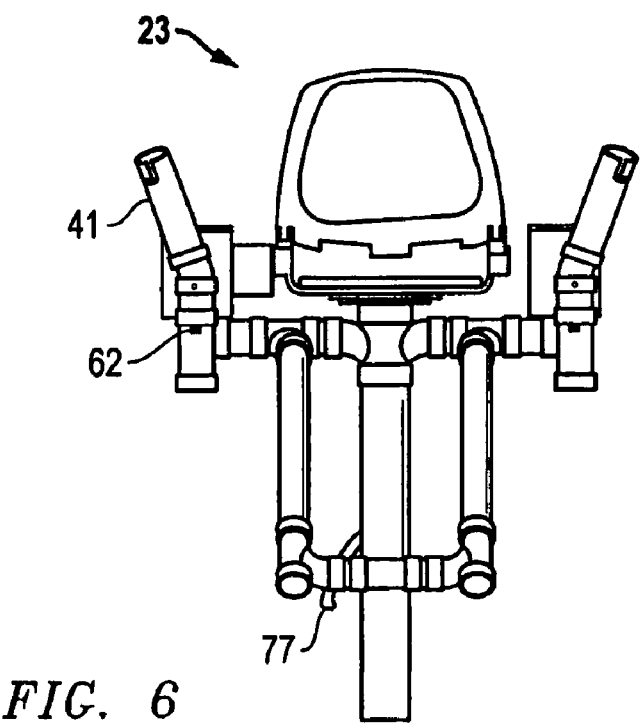
FIG. 6 is a front view of the fishing chair of FIG. 1 with the fishing pole holders extending outward away from the seat.

In the embodiment shown, the fishing pole holders 41 extend forward and upward from the horizontal tube 39 and are provided with slots 43 for securing the fishing poles 45 (FIG. 1). In the embodiment shown, slots 43 have an L-shaped configuration for improved retention of fishing poles 45, even in rough surf conditions. The weight of the reel on fishing pole 45 will pull the reel to the lower portion of the L-shaped slot 43. One way in which the fishing pole holders 41 are adjustable, via pins-and-receptacles 62 (FIGS. 5 and 6), is that they can be positioned about their vertical axes so that they are oriented forward from the seat assembly 23, or pivoted slightly outward to the left and right of the seat assembly 23.

The seat assembly 23 also has a foot rest assembly 47. In the embodiment illustrated, the foot rest assembly 47 includes a pair of inclined support tubes 49 that extend downward at an angle from the horizontal tube 39. The lower ends of the inclined support tubes 49 are joined by a horizontal foot tube 51. A brace tube 53 extends horizontally rearward from horizontal foot tube 51 and intersects the base pole 25 for additional structural support of the seat assembly 23. In the embodiment shown, horizontal foot tube 51 has a scalloped end 54 that is contoured to the shape of the outer surface of base tube 25 for improved stability.

Other accessories, auxiliary, and optional components that may be added to the device 21 include a tackle box 55, a bait box 57, a bait cutting surface 59, a fish net holder, and a fish stringer and fish basket support 63. In one version, the various components of seat assembly 23 may be fabricated from hollow PVC tubes, pipes, and fittings. The device 21 also has a utility compartment 65 having a storage area 66, one or more cup holders 67, and apertures 68 for retaining pliers, a fish hook remover, a knife, and other equipment.

Referring now to FIGS. 7-15, details regarding one embodiment of the base pole 25 are shown. The assembly of base pole 25 includes a straight, large diameter pipe 71 (such as, for example, 4-inch PVC) that is approximately 6 feet long. A smaller diameter pipe can be used if it is made of a stronger material, such as composite material. The length of pipe 71 should be sufficient to allow two to three feet of the lower portion of the pipe 71 to be buried, while still being able to elevate a fisherman positioned in the seat 35 above the waves of the surf. A grip handle 73 is mounted to an exterior surface of the pipe 71 and includes one or more levels 75 to help the user properly orient the device 21 in the surf.

Figure 7:
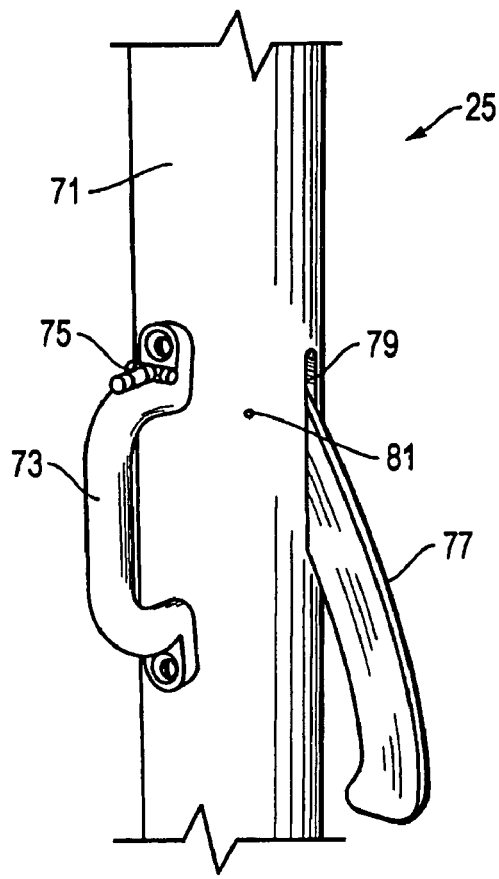
FIG. 7 is an enlarged isometric view of a base pole of the fishing chair of FIG. 1.
Figure 8:
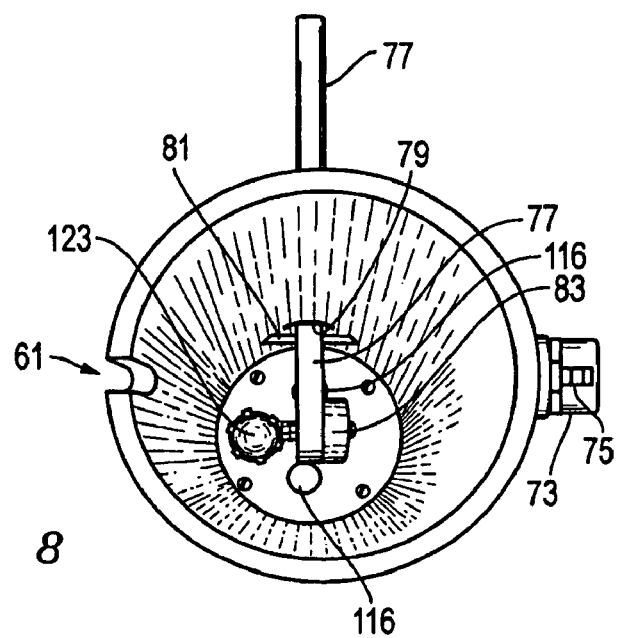
FIG. 8 is a top view of the base pole of FIG. 7 showing the upper interior of the base pole.
Figure 9:
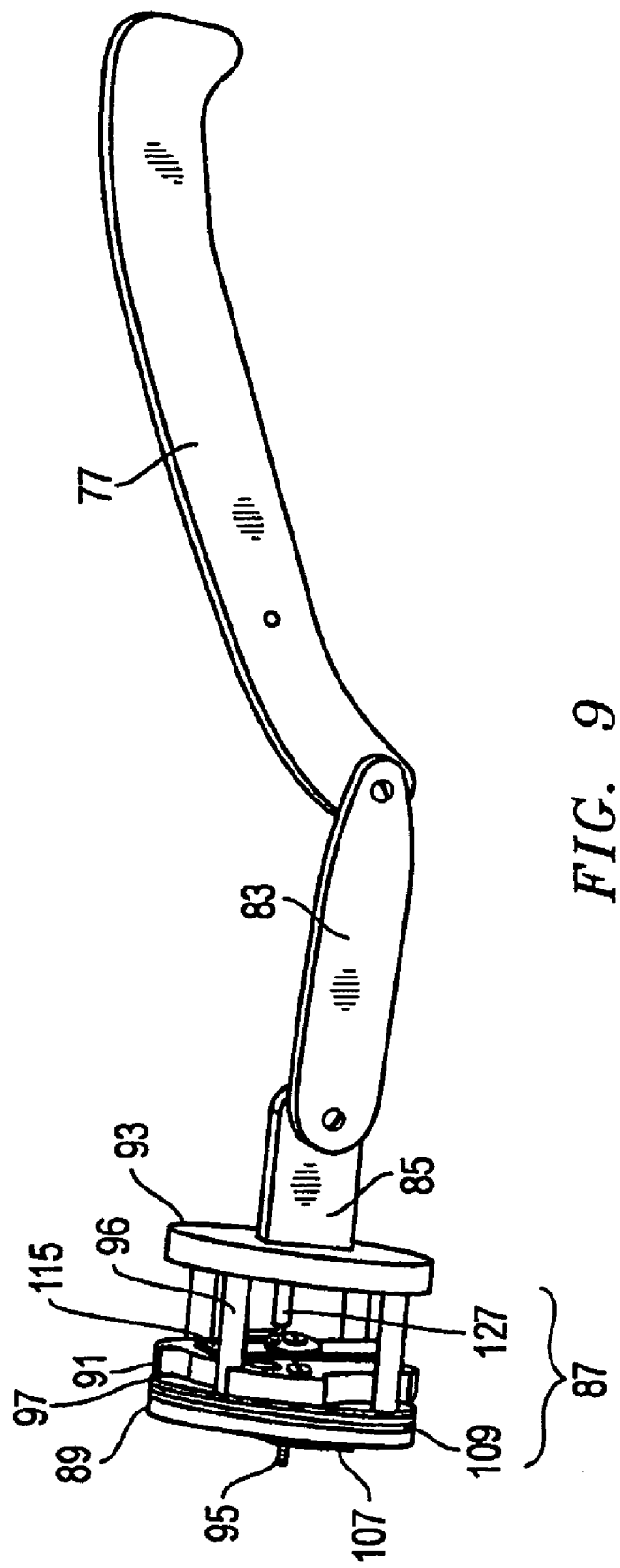
FIG. 9 is a side view of a manual pump assembly located in the base pole of FIG. 8.
Figure 10:
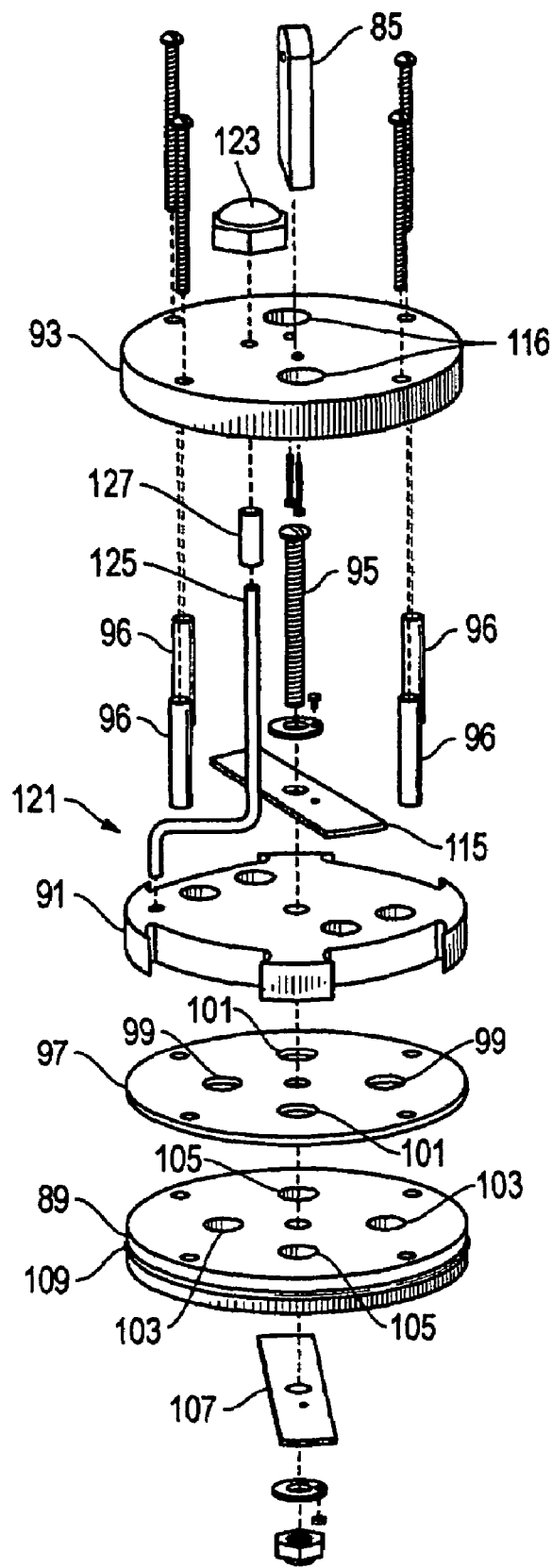
FIG. 10 is an exploded isometric view of a piston on the manual pump assembly of FIG. 9.
Figure 11:
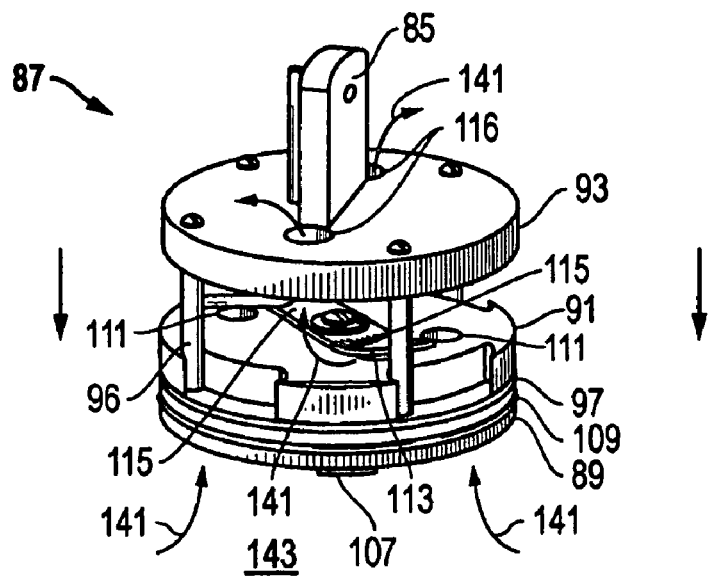
FIG. 11 is a top isometric view of the piston of FIG. 10 shown on a downstroke while burying the base pole.
Figure 12:
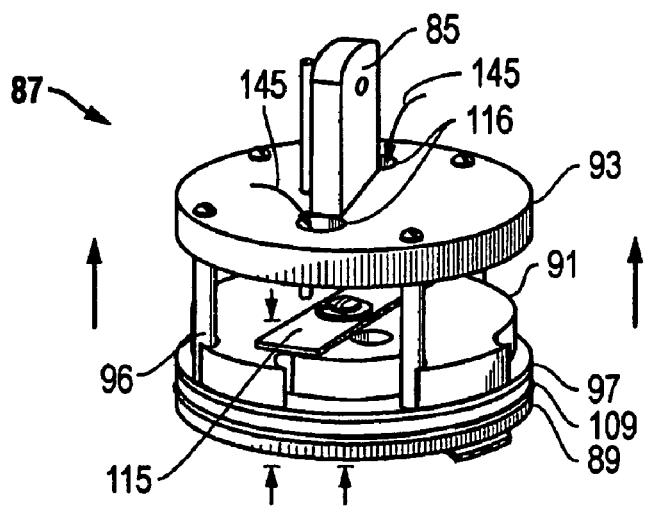
FIG. 12 is a top isometric view of the piston of FIG. 11 shown on an upstroke while burying the base pole.
Figure 13:
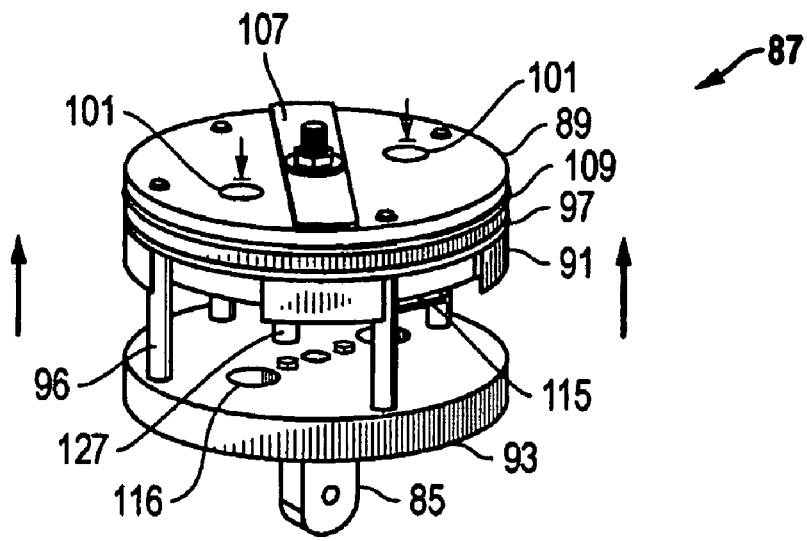
FIG. 13 is a bottom isometric view of the piston of FIG. 10 shown on a downstroke while removing the base pole.
Figure 14:
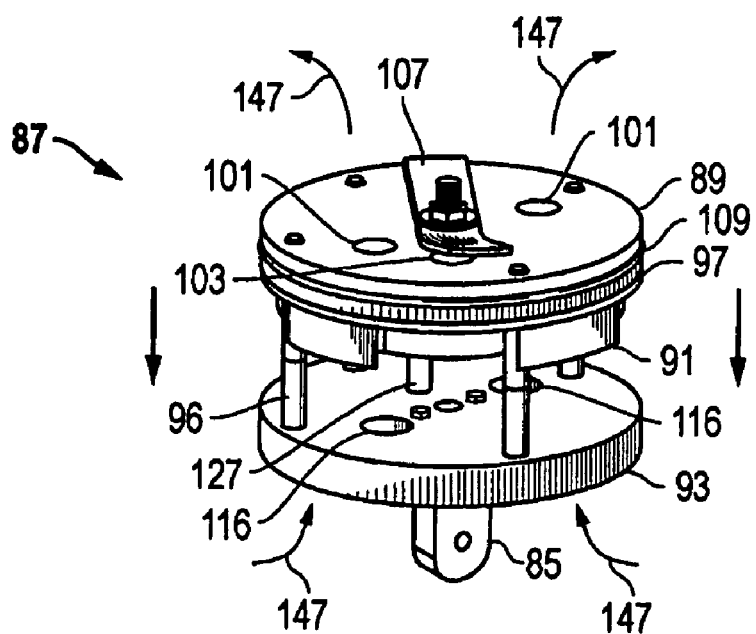
FIG. 14 is a bottom isometric view of the piston of FIG. 13 shown on an upstroke while removing the base pole.
Figure 15:
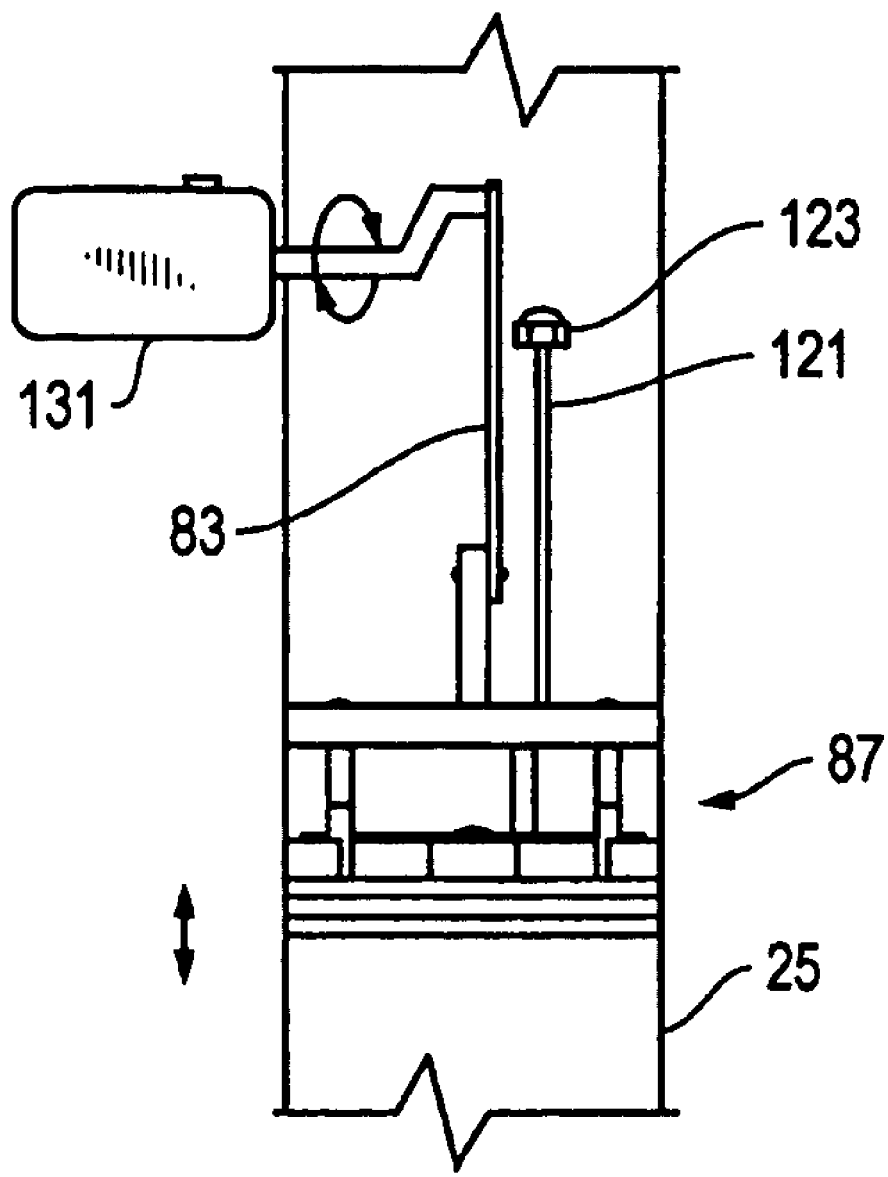
FIG. 15 is a sectional side view of the base pole of FIG. 7 shown configured with an electric motor for automated pumping of the piston of FIG. 10 and is constructed in accordance with the present invention.

The base pole 25 contains a piston assembly 87 that may be actuated by manual or automated means. In one embodiment of the automated version, an electric motor 131 (FIG. 15), such as a small, hand-held portable and/or rechargeable motor, is coupled to the piston assembly 87 for moving the piston assembly 87 between the pumping in/out positions. In one embodiment of the manual version, a pump handle 77 extends from pipe 71 through a narrow slot 79 that is formed in pipe 71. As shown in FIGS. 7 and 8, the pump handle 77 is pivotally mounted to pipe 71 on a pivot pin 81, which is rigidly mounted to pipe 71. Referring now to FIG. 9, pump handle 77 is pivotally connected to a linkage 83, which is pivotally connected to a piston rod 85. Piston rod 85 is rigidly connected to a piston assembly 87.

In the embodiment shown (FIGS. 9 and 10), piston assembly 87 includes three piston plates 89, 91, 93. Lower and upper piston plates 89 and 93 are rigidly mounted to and spaced apart from each other. Center piston plate 91 is pivotably mounted to lower piston plate 89 on a central pin 95. As shown in the illustrated version, the range of pivotal motion of center plate 91 is limited by a set of spacers 96. A gasket 97, such as a rubber seal, is located between plates 89, 91 and has two sets of apertures 99, 101 that always align with two sets of apertures 103, 105 in lower plate 89. A flexible flap 107, such as a rubber panel, is secured to the bottom of lower plate 89 and releasably covers and seals apertures 103.

An O-ring 109 also circumscribes lower plate 89. The O-ring 109 seals lower plate 89 and, thus, piston assembly 87 to the interior surface (i.e., cylinder) of base pipe 25. In the embodiment shown, upper plate 93 is closely received by the cylinder in base pole 25, but neither upper plate 93 nor center plate 91 are designed to seal against the cylinder in base pole 25. Center plate 91 also has two sets of apertures 111, 113, with apertures 113 being releasably covered and sealed by a flexible flap 115. Both flaps 107, 115 are secured to and non-rotatable relative to their respective plates 89, 91. In addition, upper plate 93 is provided with ventilation apertures 116 for providing air flow to and from the lower portions of piston assembly 87, as will be described below.

Piston assembly 87 also includes actuating means 121 for moving or pivoting the center plate 91 relative to the lower plate 89. In one embodiment, the actuating means 121 includes a handle 123 for turning a rod 125 that extends through top plate 93 for engaging and rotating center plate 91 in a cam-like manner. The lower end of rod 125 extends radially outward (FIG. 8) from the center of piston assembly 87 and then inserts into an opening located in the top surface of center ring 91. An optional hollow spacer 127 provides additional rotational stability for the rod 125.

In operation, the base pole 25 is readily embedded in (FIGS. 1, 11, and 12) and removed from (FIGS. 13-14) soil, such as the sandy bottom of a shallow surf. To bury the lower end of base pole 25, the bottom of the base pole 25 is first positioned on top of the sandy bottom at the desired insertion point. The handle 123 of the actuating means 121 is rotated to a "down" orientation, such that the pump assembly 87 will draw sand into the lower end of the base pole 25. Soil (e.g., sand, etc.) does not and is not intended to be drawn through or around the piston or its apertures during any of the pumping actions. As shown in FIG. 1, there always should be an air space between the bottom of the piston and the top of the soil located in the cylinder of the base pole 25.

On the downstroke (FIG. 11), air 141 is allowed to escape from the space 143 between the lower end of the piston assembly 87 and the sand as the piston assembly 87 is pushed down into the cylinder of the base pole 25. The air 141 escapes through apertures 101, 113 in plates 89, 91, respectively, before exiting the always-open apertures 116 in upper plate 93. The flexible flaps 115 readily deflect upward to allow air 141 to escape.

However, on the upstroke (FIG. 12), flaps 115 naturally seal shut against center plate 91 over holes 113 as a vacuum is formed between piston assembly 87 and the sand in base pole 25 to draw sand into base pole 25. The ambient air 145 is at a higher pressure than the lower portion of the base pole 25. A small amount of sealant (such as petroleum jelly) may be applied to flaps 115 to ensure a good seal. Note that flaps 107 are not used during the process of embedding base pole 25 in the sand.

To remove base pole 25 from the sand, the handle 123 of the actuating means 121 is rotated to an "up" orientation, such that the pump assembly 87 will push out the sand in the lower end of the base pole 25. On the downstroke (FIG. 13), no air is allowed to escape from the space 143 between the lower end of the piston assembly 87 and the sand as the piston assembly 87 pushes the sand down out of the base pole 25. Flaps 107 seal shut against the lower plate 89 during the downstroke. The trapped air is at a higher pressure than the ambient air. However, on the upstroke (FIG. 14), air 147 enters through apertures 103, 111 in plates 89, 91, respectively, into the cylinder of base pole 25 as shown. The flexible flaps 107 readily deflect downward to allow air 147 to enter. Again, sealant may be applied to flaps 107 to ensure a good seal. Flaps 115 are not used during the process of removing base pole 25 from the sand.

Figure 16:
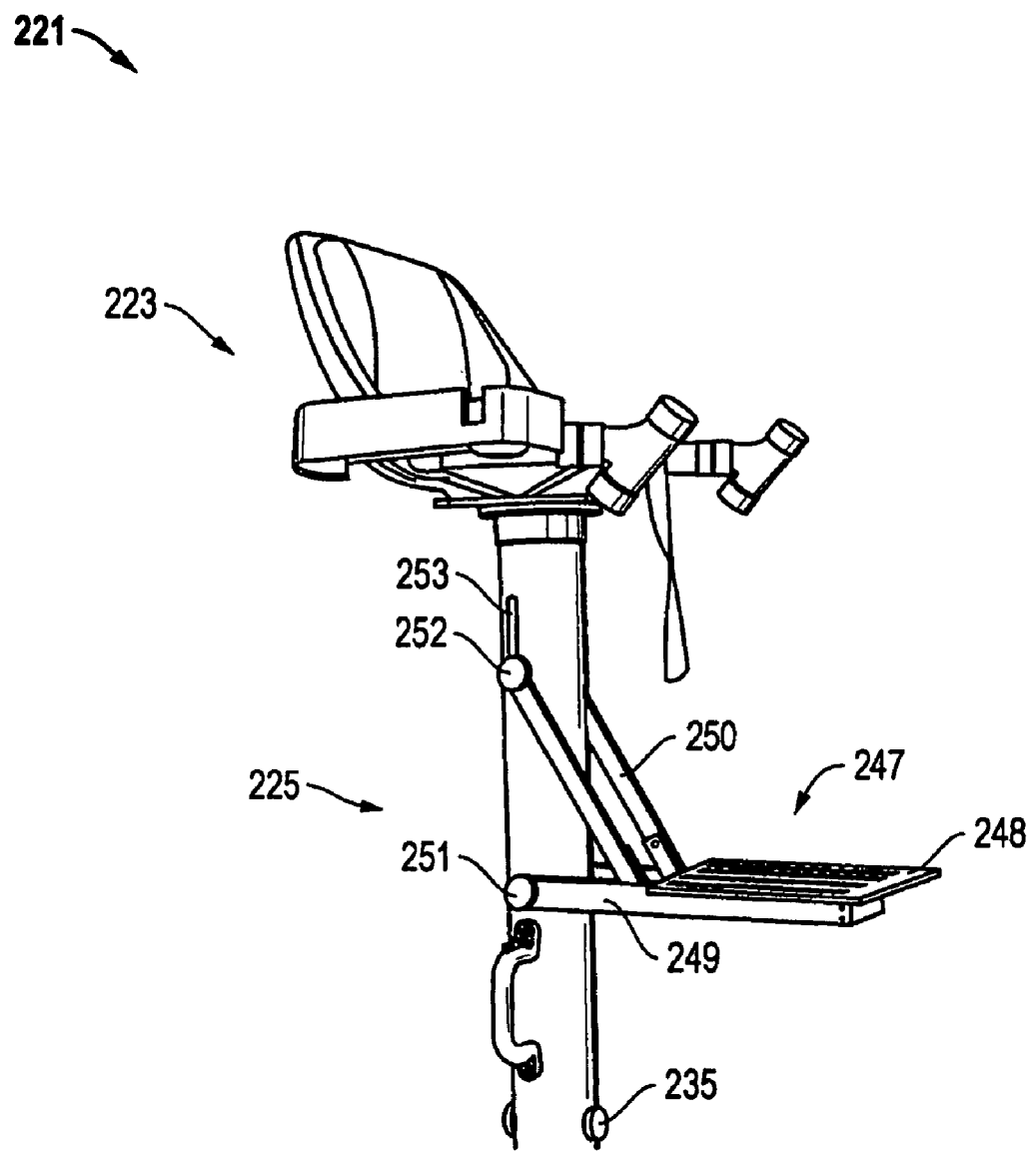
FIG. 16 is an isometric view an alternate embodiment of a fishing chair constructed in accordance with the present invention and is shown with a foot support and pump assembly in a lower position.
Figure 17:
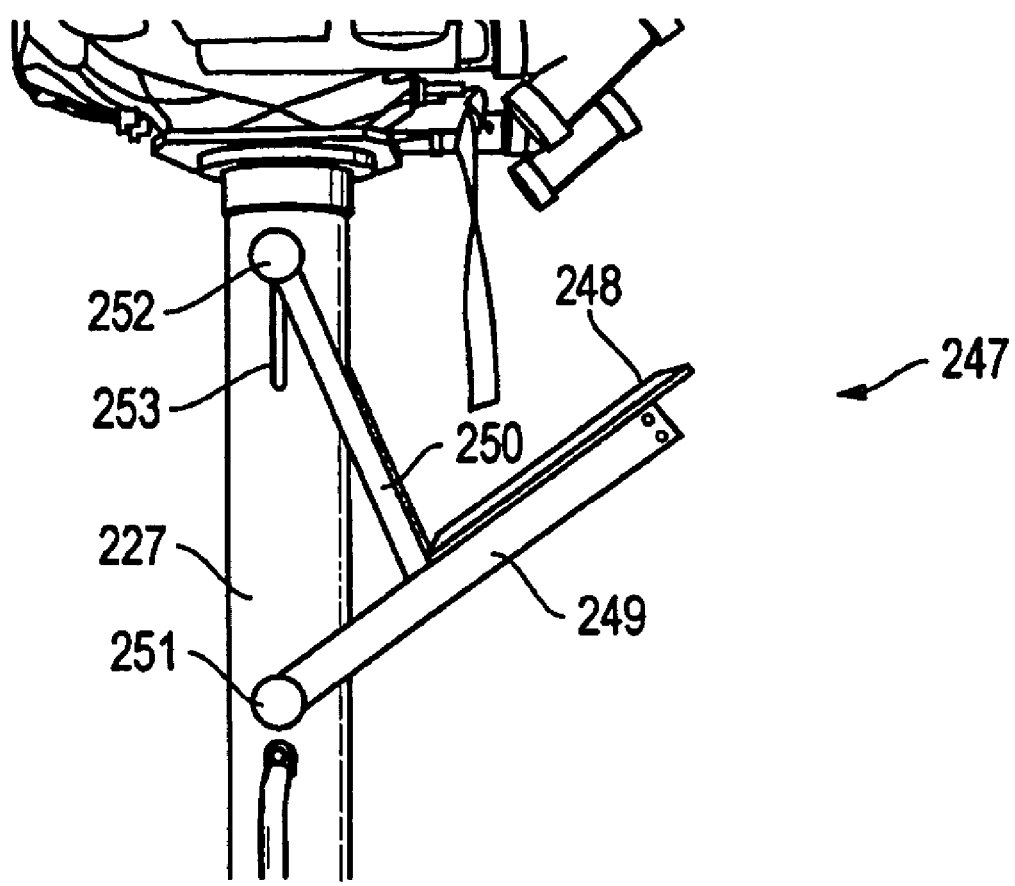
FIG. 17 is an enlarged side view of the fishing chair of FIG. 16 shown with the foot support and pump assembly in an upper position.

Referring now to FIGS. 16-21, another embodiment of the present invention is shown. The device 221 is similar in many respects to the previously described device 21. The common aspects and features between the embodiments are described above in greater detail. Like device 21, device 221 comprises two main components and a series of optional and auxiliary components. The two main components are a seat assembly 223 and a vertically-oriented base pole 225. The lower portion of the base pole 225 is removably embedded in sand or other penetrable soils. The seat assembly 223 is mounted to the upper portion of the base pole 225. The seat assembly 223 shown in FIGS. 16 and 17 is lighter in weight and utilizes optional bungee cords with plastic hooks to hold fishing poles in place.

Figure 18:
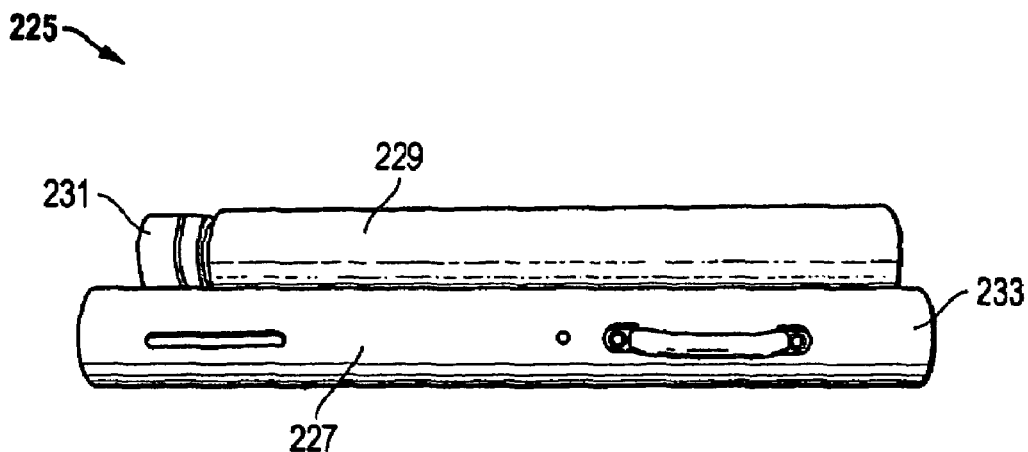
FIG. 18 is a side view of a disassembled base pole of the fishing chair of FIG. 16.

As shown in FIG. 18, the base pole 225 comprises a two-piece design, including an upper pipe 227 and a lower pipe 229. The upper end 231 of lower pipe 229 inserts into the lower end 233 of upper pipe 227, which are sealed against each other with an O-ring design. A plastic threaded bolt assembly 235 (FIG. 16) may be used to rotationally align and secure upper pipe 227 and lower pipe 229 together.

Device 221 has a foot rest assembly 247 (FIGS. 16 and 17) that differs significantly from the previous embodiment in that it doubles as the pump handle. Alternatively, the pump assembly may be automated so that no manual pumping is required, such as in a manner like that described above for the previous embodiment.

In the embodiment shown, foot rest assembly 247 has a support 248 upon which a seated fisherman places his or her feet, a pair of lower struts 249, and a pair of pivotable upper struts 250. Support 248 is rigidly mounted to the distal ends of lower struts 249. The proximal ends of lower struts 249 are mounted to upper pipe 227 on a pivot 251. Pivot 251 extends through upper pipe 227 in a sealed tube to maintain an airtight compartment for the pump. The distal ends of upper struts 250 are pivotally mounted to respective ones of the lower struts 249 adjacent support 248. The proximal ends of upper struts 250 are mounted to upper tube 227 on a pivot 252. Pivot 252 is located in vertical slots 253 formed in opposite sides of upper tube 227.

Figure 19:
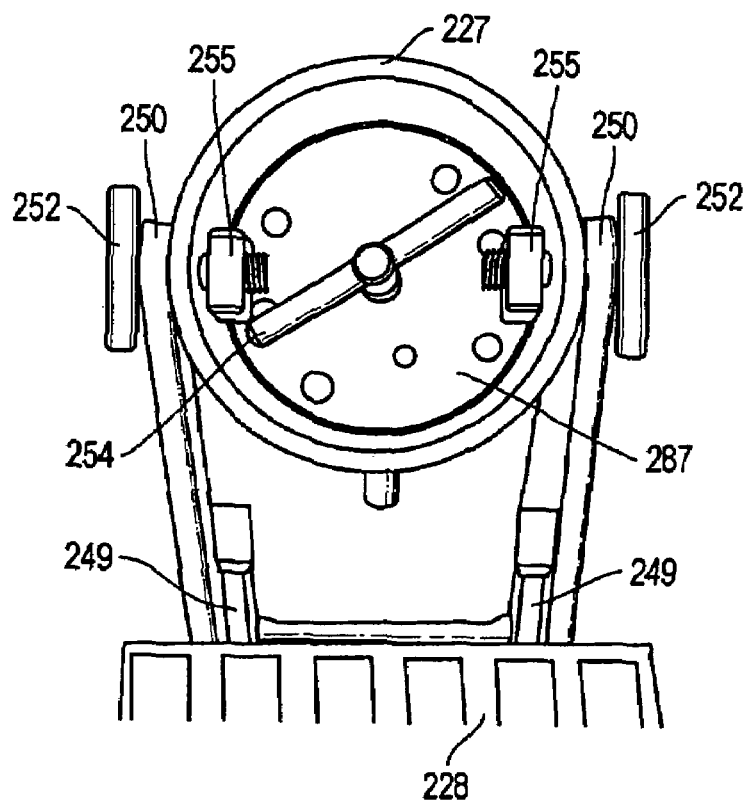
FIG. 19 is a top view of the fishing chair of FIG. 16 shown with a seat assembly thereof removed therefrom.
Figure 20:
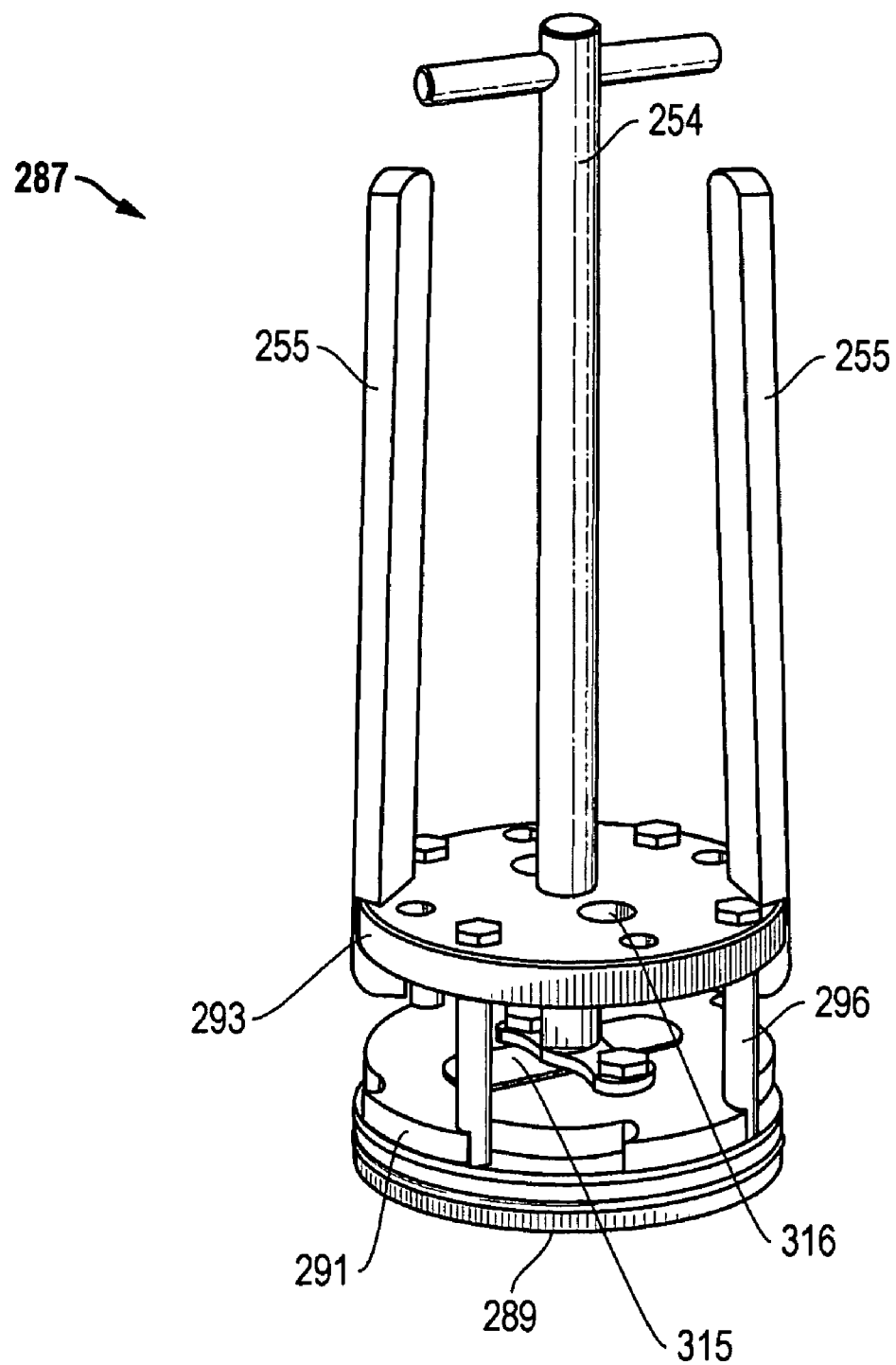
FIG. 20 is an isometric view of an internal pump assembly for the fishing chair of FIG. 16.
Figure 21:
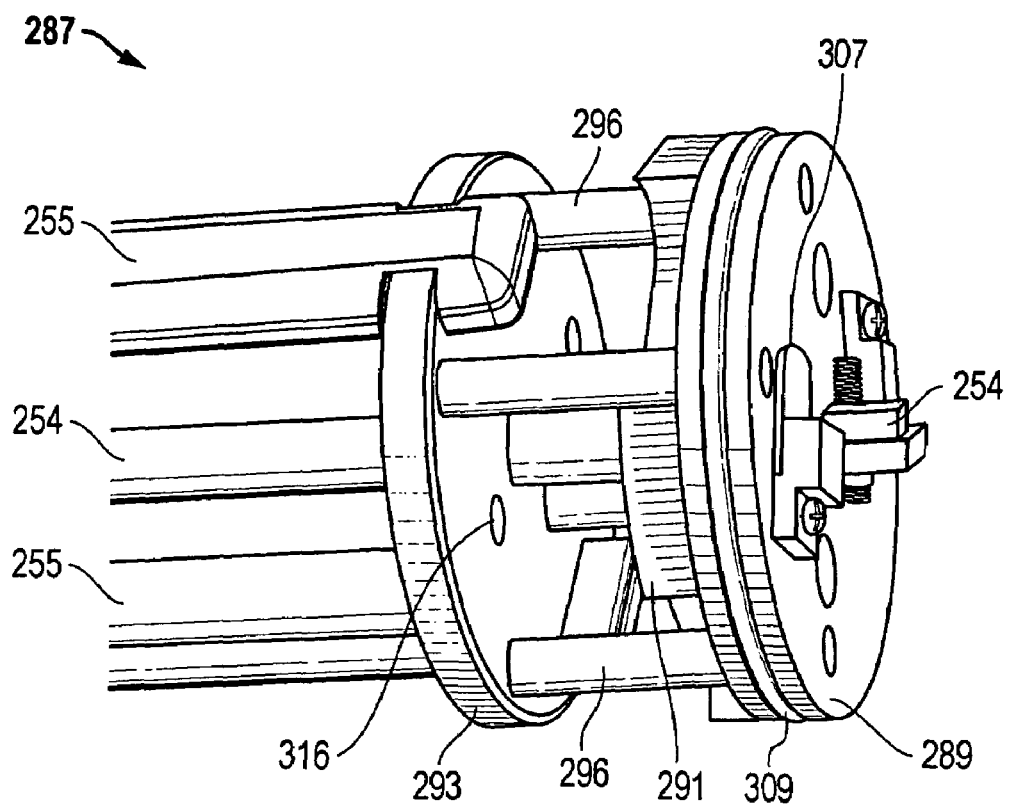
FIG. 21 is an enlarged isometric view of a portion of the internal pump assembly of FIG. 20 showing details thereof.

As shown in FIG. 19, pivot 252 may comprise a pair of threaded pins that extend through slots 253 in upper pipe 227 to connect to a respective pair of pump braces 255. Thus, in one embodiment, the manual movement of foot rest assembly 247 between its upper and lower positions (FIGS. 16 and 17) forces the piston assembly 287 inside upper pipe 227 to pump by moving axially up and down. This pump design has an axial stroke of about five to seven inches.

Referring now to FIGS. 17-19, details regarding the piston assembly 287 are shown. Like device 21, device 221 also has actuating means (e.g., a handle 254—like handle 123 previously described) for reversing a pumping direction of the pump. Handle 254 is concentric with the pump assembly and, when twisted about its axis, does not require a cam design to reverse orientation of the pump. Handle 254 and pump braces 255 extend downward to the piston as shown.

In the embodiment shown, piston assembly 87 includes three piston plates 289, 291, 293. Lower and upper piston plates 289 and 293 are rigidly mounted to and spaced apart from each other. Center piston plate 291 is pivotally mounted to lower piston plate 289 on the lower end of handle 254, and retained there with a retainer block. It is the handle 254 that moves or pivots the center plate 291 relative to the lower plate 289. The range of pivotal motion of center plate 291 is limited by a set of spacers 296. As described above for the previous embodiment, a gasket may be located between plates 289, 291 and has two sets of apertures that always align with two sets of apertures in lower plate 289. Flexible flaps 307 are secured to the bottom of lower plate 289 and releasably cover and seal its apertures. Flaps 307 are retained with clamping devices.

An O-ring 309 also circumscribes lower plate 289. The O-ring 309 seals lower plate 289 and, thus, piston assembly 287 to the interior surface of upper pipe 227. In the embodiment shown, upper plate 293 is closely received by upper pipe 227, but neither upper plate 293 nor center plate 291 is designed to seal inside upper pipe 227. Center plate 291 also has two sets of apertures that are releasably covered and sealed by flexible flaps 315. Both flaps 307, 315 are secured to and non-rotatable relative to their respective plates 289, 291. Although flaps 307, 315 appear different in construction, they operated in substantially the same manner as described above for the previous embodiment. In addition, upper plate 293 is provided with ventilation apertures 316 for providing air flow to and from the lower portions of piston assembly 287.

In operation, the base pole 225 is readily embedded in and removed from a surf bottom, as described above for the previous embodiment. To bury the lower end of base pole 225, the bottom of the base pole 225 is first positioned on top of the sandy bottom at the desired insertion point. The handle 254 of the actuating means is rotated to a "down" orientation, such that the pivot assembly 287 will draw sand into the lower end of the base pole 225.

On the downstroke, air is allowed to escape from the space between the lower end of the piston assembly 287 and the sand as the piston assembly 287 is pushed down into the base pole 225. The air escapes through the apertures in plates 289, 291 before exiting the always-open apertures 316 in upper plate 293. The flexible flaps 315 readily deflect upward to allow air to escape in that direction. However, on the upstroke, flaps 315 naturally seal shut against center plate 291 over their holes as a vacuum is formed between piston assembly 287 and the sand in base pole 225 to draw sand into base pole 225. The ambient air is at a higher pressure than the lower portion of the base pole 225. Flaps 307 are not used during the process of embedding base pole 225 in the sand.

To remove base pole 225 from the sand, the handle 254 is rotated to an "up" orientation, such that the piston assembly 287 pushes out the sand in the lower end of the base pole 225. On the downstroke, no air is allowed to escape from the space between the lower end of the piston assembly 287 and the sand as the piston assembly 287 pushes the sand down out of the base pole 225. Flaps 307 seal shut against the lower plate 289 during the downstroke. The trapped air is at a higher pressure than the ambient air. However, on the upstroke, air enters through the apertures in plates 289, 291 into base pole 225. The flexible flaps 307 readily deflect downward to allow air to enter. Flaps 315 are not used during the process of removing base pole 225 from the sand.

While the invention has been shown or described in only some of its forms, it should be apparent to those skilled in the art that it is not so limited, but is susceptible to various changes without departing from the scope of the invention. For example, although the present invention is well-suited for fishing applications, it also may be used for other outdoor activities as well, including hunting and other sporting and nature-oriented activities.

What is claimed is:

1. A chair, comprising:
    a base pole having a top, a bottom, and an interior, the base pole being adapted to be mounted in a soil;
    a seat assembly mounted to the top of the base pole and adapted to support a seated user therein;
    a pump assembly mounted to the base pole and adapted to draw the soil into the interior of the base pole and bury the bottom of the base pole in the soil such that the base pole forms a foundation for supporting the seated user in the seat assembly; and
    the pump assembly is reversible, such that the pump assembly evacuates the soil from the interior of the base pole to remove the base pole from the soil, and the pump assembly has means for manually reconfiguring the pump assembly to either pump soil out of the base pole or pump soil into the base pole.

2. The chair of claim 1, wherein the base pole comprises an upper pipe and a lower pipe that are secured to each other with a plastic threaded bolt assembly that rotationally aligns and secures the upper pipe and the lower pipe together, the upper and lower pipes are sealed to each other with an O-ring, and the seat assembly is completely detachable from the base pole for ease of installation in the soil.

3. The chair of claim 1, further comprising a foot rest assembly mounted to the base pipe beneath the seat assembly for providing a support for feet of the seated user, and the foot rest assembly is also a pump handle for the pump assembly, the foot rest assembly being pivotable between a raised and lowered position for moving a piston of the pump assembly within the base pole.

4. The chair of claim 1, wherein the pump assembly comprises a piston assembly having a lower plate, a center plate, and an upper plate, the lower and upper plates being rigidly mounted to and spaced apart from each other, and the center plate being pivotably mounted to the lower plate, each of the plates having an aperture for selectively permitting air flow therethrough, and at least some of the apertures having flexible flaps for releasably covering and sealing respective ones of the apertures, and an O-ring circumscribes the lower plate to seal the lower plate to the interior of the base pipe, and the upper and center plates are closely received by but do not seal against the base pipe.

5. The chair of claim 1, wherein the pump assembly is automated such that manual pumping is not required, and the seat assembly further comprises a fishing pole holder having a slot for securing and retaining a fishing pole therein, a tackle box, a bait box, a bait cutting surface, a fish net holder, a fish stringer, a fish basket support, a utility compartment having a storage area, a cup holder, and apertures for retaining equipment.

6. A chair, comprising:
    a base pole having a top, a bottom, and an interior, the base pole being adapted to be mounted in a soil;
    a seat assembly mounted to the top of the base pole and adapted to support a seated user therein;
    a pump assembly mounted to the base pole and adapted to draw the soil into the interior of the base pole and bury the bottom of the base pole in the soil such that the base pole forms a foundation for supporting the seated user in the seat assembly; and
    a foot rest assembly mounted to the base pipe beneath the seat assembly for providing a support for feet of the seated user, the foot rest assembly also being a pump handle for the pump assembly, the foot rest assembly being pivotable between a raised and lowered position for moving a piston of the pump assembly within the base pole.

7. The chair of claim 6, wherein the pump assembly is reversible, such that the pump assembly evacuates the soil from the interior of the base pole to remove the base pole from the soil, and the pump assembly is manually reconfigurable to either pump soil out of the base pole or pump soil into the base pole.

8. The chair of claim 6, wherein the base pole comprises an upper pipe and a lower pipe that are secured to each other with a plastic threaded bolt assembly that rotationally aligns and secures the upper pipe and the lower pipe together, the upper and lower pipes are sealed to each other with an O-ring, and the seat assembly is completely detachable from the base pole for ease of installation in the soil.

9. The chair of claim 6, wherein the piston comprises a lower plate, a center plate, and an upper plate, the lower and upper plates being rigidly mounted to and spaced apart from each other, and the center plate being pivotably mounted to the lower plate, each of the plates having an aperture for selectively permitting air flow therethrough, and at least some of the apertures having flexible flaps for releasably covering and sealing respective ones of the apertures, and an O-ring circumscribes the lower plate to seal the lower plate to the interior of the base pipe, and the upper and center plates are closely received by but do not seal against the base pipe.

10. The chair of claim 6, wherein the pump assembly is automated such that manual pumping is not required, and the seat assembly further comprises a fishing pole holder having a slot for securing and retaining a fishing pole therein, a tackle box, a bait box, a bait cutting surface, a fish net holder, a fish stringer, a fish basket support, a utility compartment having a storage area, a cup holder, and apertures for retaining equipment.

11. A chair, comprising:
   a base pole having a top, a bottom, and an interior, the base pole being adapted to be mounted in a soil;
   a seat assembly mounted to the top of the base pole and adapted to support a seated user therein;
   a pump assembly mounted to the base pole and adapted to draw the soil into the interior of the base pole and bury the bottom of the base pole in the soil such that the base pole forms a foundation for supporting the seated user in the seat assembly, the pump assembly being reversible, such that the pump assembly evacuates the soil from the interior of the base pole to remove the base pole from the soil, and the pump assembly is manually reconfigurable to either pump soil out of the base pole or pump soil into the base pole;
   a foot rest assembly mounted to the base pipe beneath the seat assembly for providing a support for feet of the seated user, the foot rest assembly is also a pump handle for the pump assembly, the foot rest assembly being pivotable between a raised and lowered position for moving a piston of the pump assembly within the base pole; and
   the piston comprising a lower plate, a center plate, and an upper plate, the lower and upper plates being rigidly mounted to and spaced apart from each other, and the center plate being pivotably mounted to the lower plate, each of the plates having an aperture for selectively permitting air flow therethrough, and at least some of the apertures having flexible flaps for releasably covering and sealing respective ones of the apertures, and an O-ring circumscribes the lower plate to seal the lower plate to the interior of the base pipe, and the upper and center plates are closely received by but do not seal against the base pipe.

12. The chair of claim 11, wherein the base pole comprises an upper pipe and a lower pipe that are secured to each other with a plastic threaded bolt assembly that rotationally aligns and secures the upper pipe and the lower pipe together, the upper and lower pipes are sealed to each other with an O-ring, and the seat assembly is completely detachable from the base pole for ease of installation in the soil.

13. The chair of claim 11, further comprising means for limiting a depth of insertion of the bottom of the base pole into the soil.

14. The chair of claim 11, wherein the seat assembly swivels with respect to the base pole, and a seat of the seat assembly is foldable and includes a retention device for retaining the seat in a folded configuration.

15. The chair of claim 11, wherein the seat assembly further comprises a fishing pole holder having a slot for securing and retaining a fishing pole therein, a tackle box, a bait box, a bait cutting surface, a fish net holder, a fish stringer, a fish basket support, a utility compartment having a storage area, a cup holder, and apertures for retaining equipment.

16. The chair of claim 11, wherein the pump assembly is automated such that manual pumping is not required.

* * * * *